United States Patent
Jose et al.

(10) Patent No.: US 8,908,606 B2
(45) Date of Patent: Dec. 9, 2014

(54) OPPORTUNISTIC INTERFERENCE ALIGNMENT FOR MULTI-CELL MULTI-USER UPLINK

(71) Applicant: QUALCOMM Incorporated, San Diego, CA (US)

(72) Inventors: Jubin Jose, Bound Brook, NJ (US); Xinzhou Wu, Hillsborough, NJ (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 13/747,601

(22) Filed: Jan. 23, 2013

(65) Prior Publication Data
US 2014/0204773 A1    Jul. 24, 2014

(51) Int. Cl.
*H04W 4/00*    (2009.01)
*H04B 7/06*    (2006.01)
*H04B 7/04*    (2006.01)
*H04W 72/08*    (2009.01)

(52) U.S. Cl.
CPC .......... *H04W 72/082* (2013.01); *H04B 7/0617* (2013.01); *H04B 7/0413* (2013.01); *H04B 7/0404* (2013.01)
USPC ........................................ 370/328; 455/63.1

(58) Field of Classification Search
None
See application file for complete search history.

(56) References Cited

U.S. PATENT DOCUMENTS

| | | | |
|---|---|---|---|
| 7,729,432 B2 | 6/2010 | Khan et al. | |
| 7,768,984 B2 | 8/2010 | Lee et al. | |
| 7,787,546 B2 | 8/2010 | Khan | |
| 8,036,098 B2 | 10/2011 | Pereira et al. | |
| 2007/0082619 A1 | 4/2007 | Zhang et al. | |
| 2008/0285477 A1 | 11/2008 | Kuroda et al. | |
| 2009/0052566 A1 | 2/2009 | Maltsev et al. | |
| 2009/0247086 A1 | 10/2009 | Lin et al. | |
| 2010/0226293 A1 | 9/2010 | Kim et al. | |
| 2010/0227613 A1 | 9/2010 | Kim et al. | |
| 2010/0227635 A1* | 9/2010 | Kim et al. | ..... 455/501 |
| 2010/0227637 A1 | 9/2010 | Kwon et al. | |

(Continued)

FOREIGN PATENT DOCUMENTS

KR    2012034973 A    4/2012

OTHER PUBLICATIONS

International Search Report and Written Opinion—PCT/US2014/011609—ISA/EPO—Apr. 17, 2014.

(Continued)

*Primary Examiner* — Anh-Vu Ly
(74) *Attorney, Agent, or Firm* — Arent Fox LLP

(57) ABSTRACT

A UE receives information indicating a receive direction vector for a serving BS and a set of receive direction vectors for at least one interfering BS. The UE determines a channel between the UE and the serving BS and a set of channels between the UE and each of the at least one interfering BS. The UE determines a transmit direction vector to apply to modulated symbols for mapping to a set of resource blocks for an uplink transmission based on the channel, the set of channels, the receive direction vector, and the set of receive direction vectors. The UE determines an interference caused to the at least one interfering BS by the uplink transmission based on the transmit direction vector, the set of channels, and the set of receive direction vectors. The UE transmits information indicating the interference to the serving BS.

32 Claims, 13 Drawing Sheets

(56) References Cited

U.S. PATENT DOCUMENTS

| | | | |
|---|---|---|---|
| 2010/0246515 A1 | 9/2010 | Tsai et al. | |
| 2010/0248712 A1* | 9/2010 | Lee et al. | 455/423 |
| 2010/0291938 A1 | 11/2010 | Jang | |
| 2011/0059765 A1 | 3/2011 | Kim et al. | |
| 2011/0090882 A1 | 4/2011 | Lee et al. | |
| 2011/0141926 A1 | 6/2011 | Damnjanovic et al. | |
| 2011/0177834 A1* | 7/2011 | Shin et al. | 455/501 |
| 2011/0305286 A1 | 12/2011 | Shimezawa et al. | |
| 2012/0040706 A1* | 2/2012 | Shin et al. | 455/517 |
| 2012/0062421 A1 | 3/2012 | Su et al. | |
| 2012/0077485 A1 | 3/2012 | Shin et al. | |
| 2012/0077511 A1* | 3/2012 | Shin et al. | 455/452.1 |
| 2012/0122502 A1* | 5/2012 | Shin et al. | 455/501 |
| 2012/0170442 A1 | 7/2012 | Razaviyayn et al. | |
| 2012/0178482 A1* | 7/2012 | Seo et al. | 455/501 |
| 2012/0269077 A1 | 10/2012 | Bazzi et al. | |
| 2012/0281780 A1 | 11/2012 | Huang et al. | |
| 2012/0307929 A1 | 12/2012 | Seo et al. | |
| 2013/0157705 A1* | 6/2013 | Kwon et al. | 455/501 |
| 2013/0344908 A1* | 12/2013 | Hwang | 455/501 |
| 2014/0094164 A1* | 4/2014 | Hwang et al. | 455/423 |
| 2014/0105120 A1 | 4/2014 | Jose et al. | |
| 2014/0105121 A1 | 4/2014 | Jose et al. | |
| 2014/0200010 A1* | 7/2014 | Jose et al. | 455/450 |

OTHER PUBLICATIONS

Jung B.C., et al., "Opportunistic Interference Alignment for Interference—Limited Cellular TDD Uplink", IEEE Communications Letters, IEEE Service Center, Piscataway, MJ, US, vol. 15, No. 2, Feb. 1, 2011, pp. 148-150, XP011345749, ISSN: 1089-7798, DOI: 10.1109/LCOMM .2011.1213 10.101439 p. 148, right-hand column, line 13-line 17 p. 149, left-hand column, line 8-line 10, III, OIA in cellular networks.

Larsson P, et al., "Multiuser diversity forwarding in multihop packet radio networks" IEEE Wireless Communications and Networking Conference, vol. 4, Mar. 13, 2005, pp. 2188-2194, XP010791518 IEEE, Piscataway, NJ, USA 001: 10.1109/WCNC. 2005.

Jung, et al., "Opportunistic Interference Mitigation Achieves Optimal Degrees-of-Freedom in Wireless Multi-Cell Uplink Networks", IEEE Transactions on Communications, Vol. 60, No. 7, Jul. 2012, 10pgs.

Khan, et al., "Interference-Driven Linear Precoding in Multiuser MISO Downlink Cognitive Radio Network", Vehicular Technology, IEEE Transactions, vol. 61 , Issue: 6, Jul. 2012, pp. 2531-2543.

Tang, et al., "Opportunistic MIMO Multi-Cell Interference Alignment Techniques", Internet Multimedia Systems Architecture and Application (IMSAA), 2011 IEEE 5th International Conference, Dec. 2011, 4 pgs.

* cited by examiner

OPPORTUNISTIC INTERFERENCE ALIGNMENT FOR MULTI-CELL MULTI-USER UPLINK

BACKGROUND

1. Field

The present disclosure relates generally to communication systems, and more particularly, to opportunistic interference alignment for multi-cell multi-user uplink.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus is a user equipment (UE). The UE receives information indicating a receive direction vector for a serving base station and a set of receive direction vectors for at least one interfering base station. The UE determines a channel between the UE and the serving base station. The UE determines a set of channels between the UE and each of the at least one interfering base station. The UE determines a transmit direction vector to apply to modulated symbols for mapping to a set of resource blocks for an uplink transmission based on the channel, the set of channels, the receive direction vector, and the set of receive direction vectors. Each modulated symbol of the modulated symbols is mapped to a plurality of resource blocks of the set of resource blocks. The UE determines an interference caused to the at least one interfering base station by the uplink transmission based on the transmit direction vector, the set of channels, and the set of receive direction vectors. The UE transmits information indicating the interference to the serving base station.

DETAILED DESCRIPTION

Figure 1:
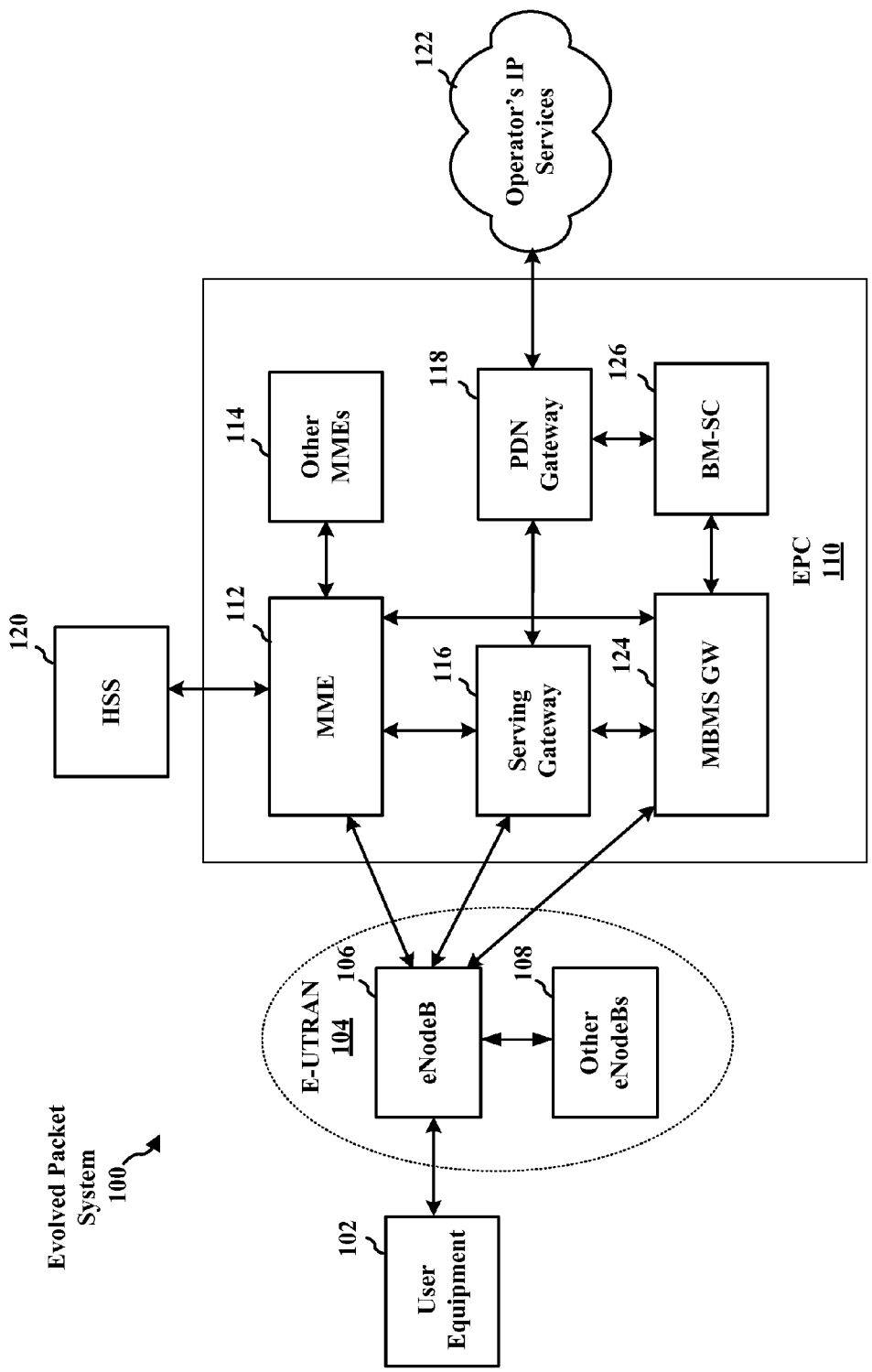
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station (BS), a Node B, an access point, a base transceiver station, a radio BS, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to an MBSFN area broadcasting a particular service, and may be responsible for session management (start/stop) and for collecting eMBMS related charging information.

Figure 2:
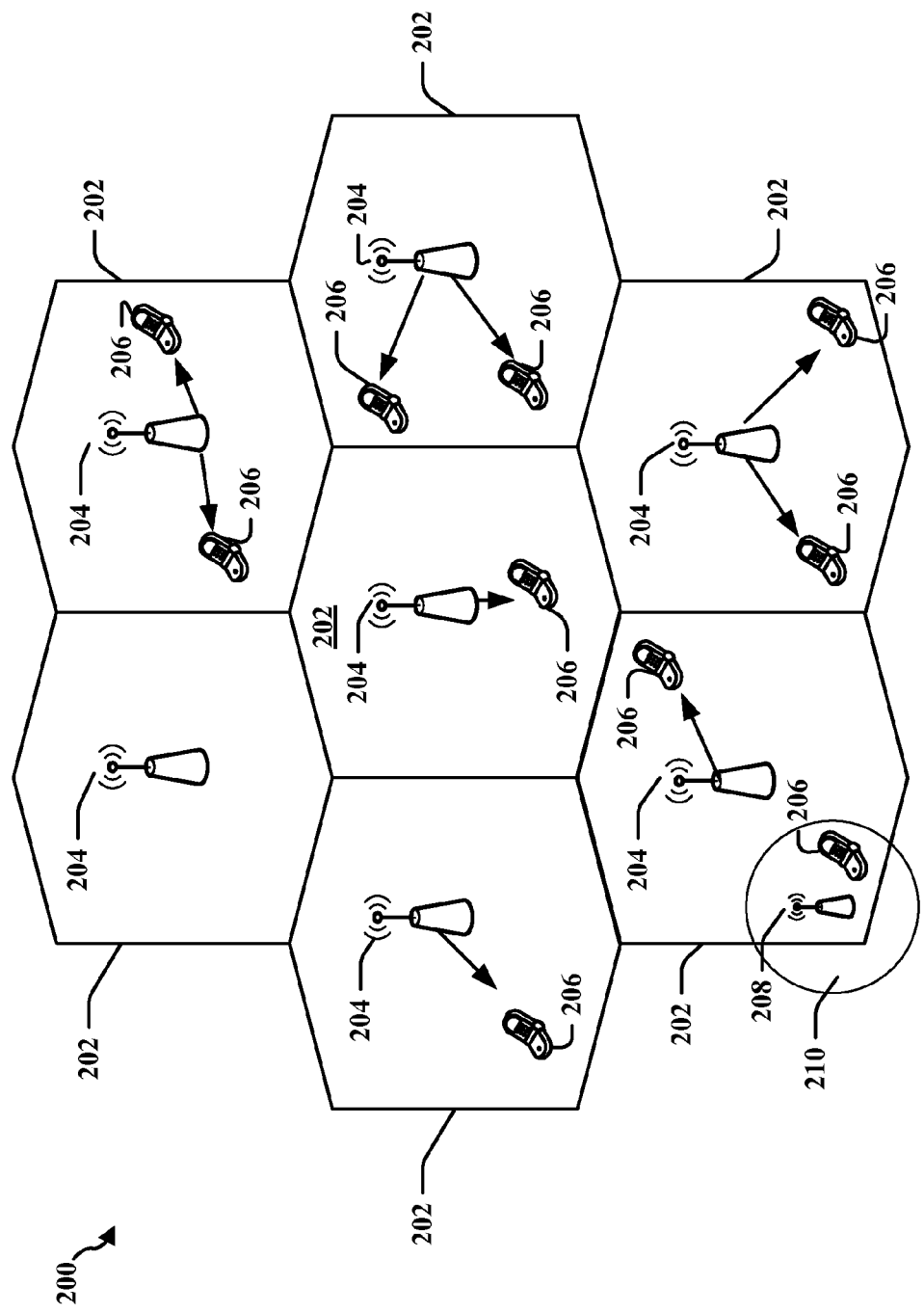
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
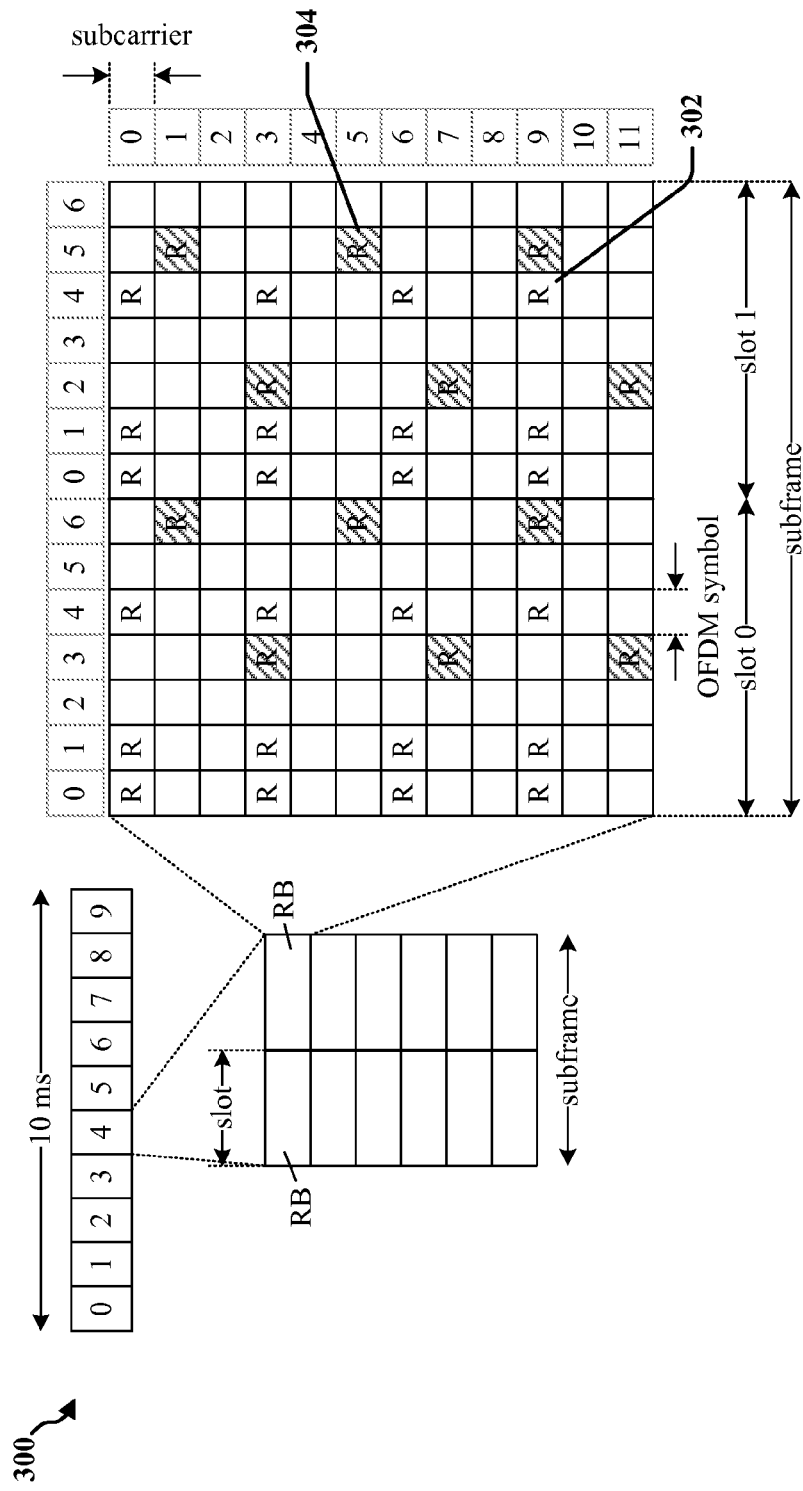
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
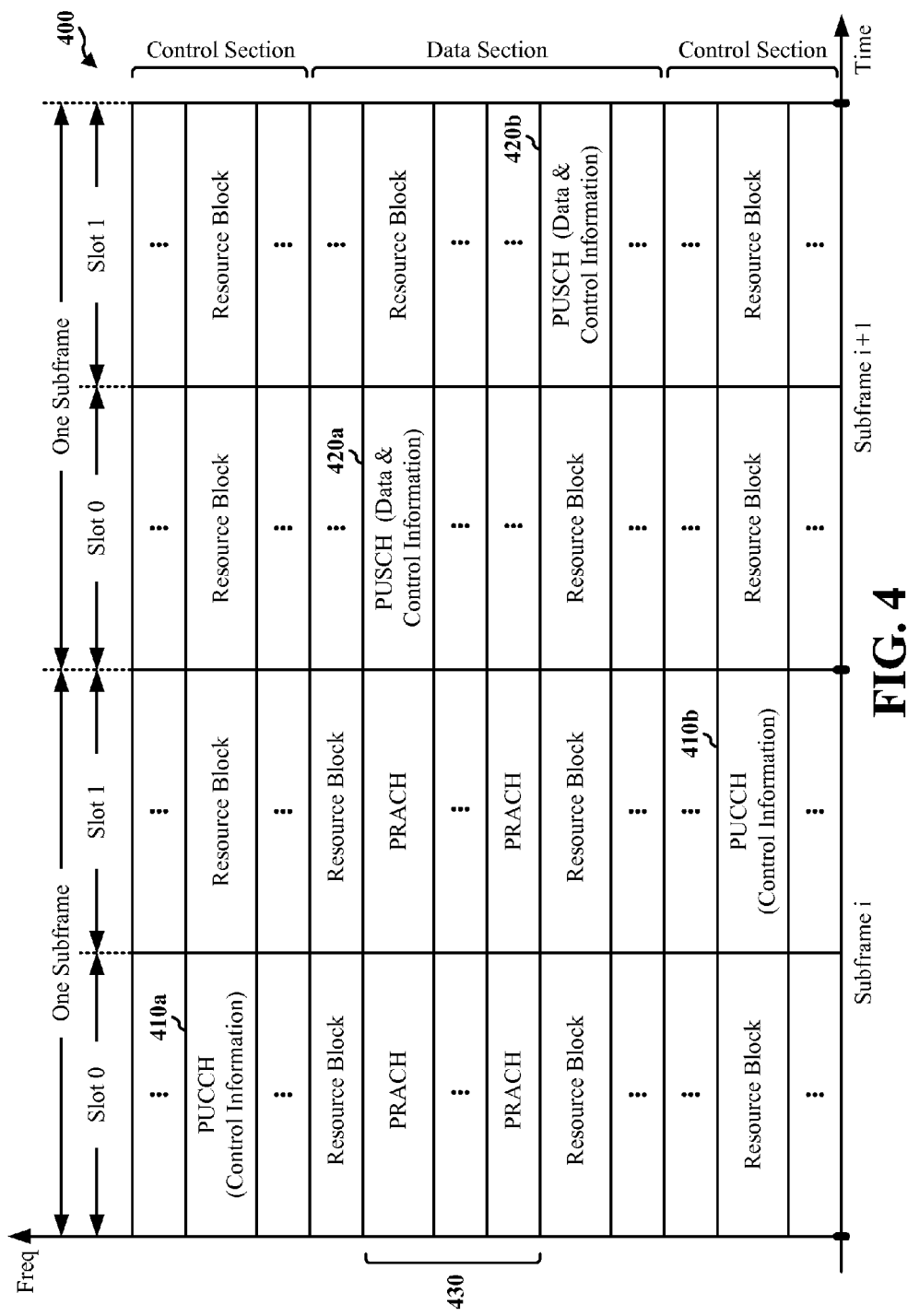
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
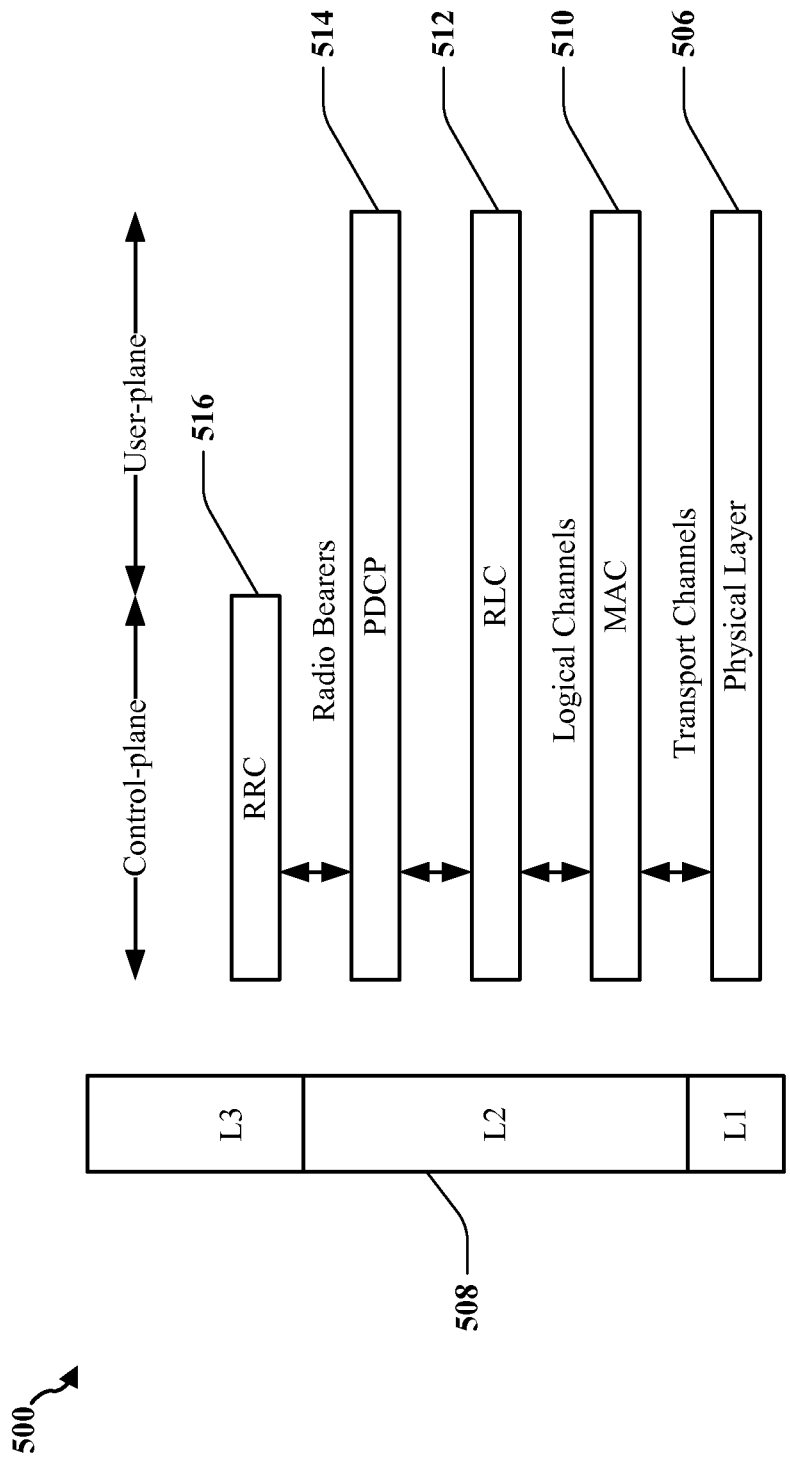
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
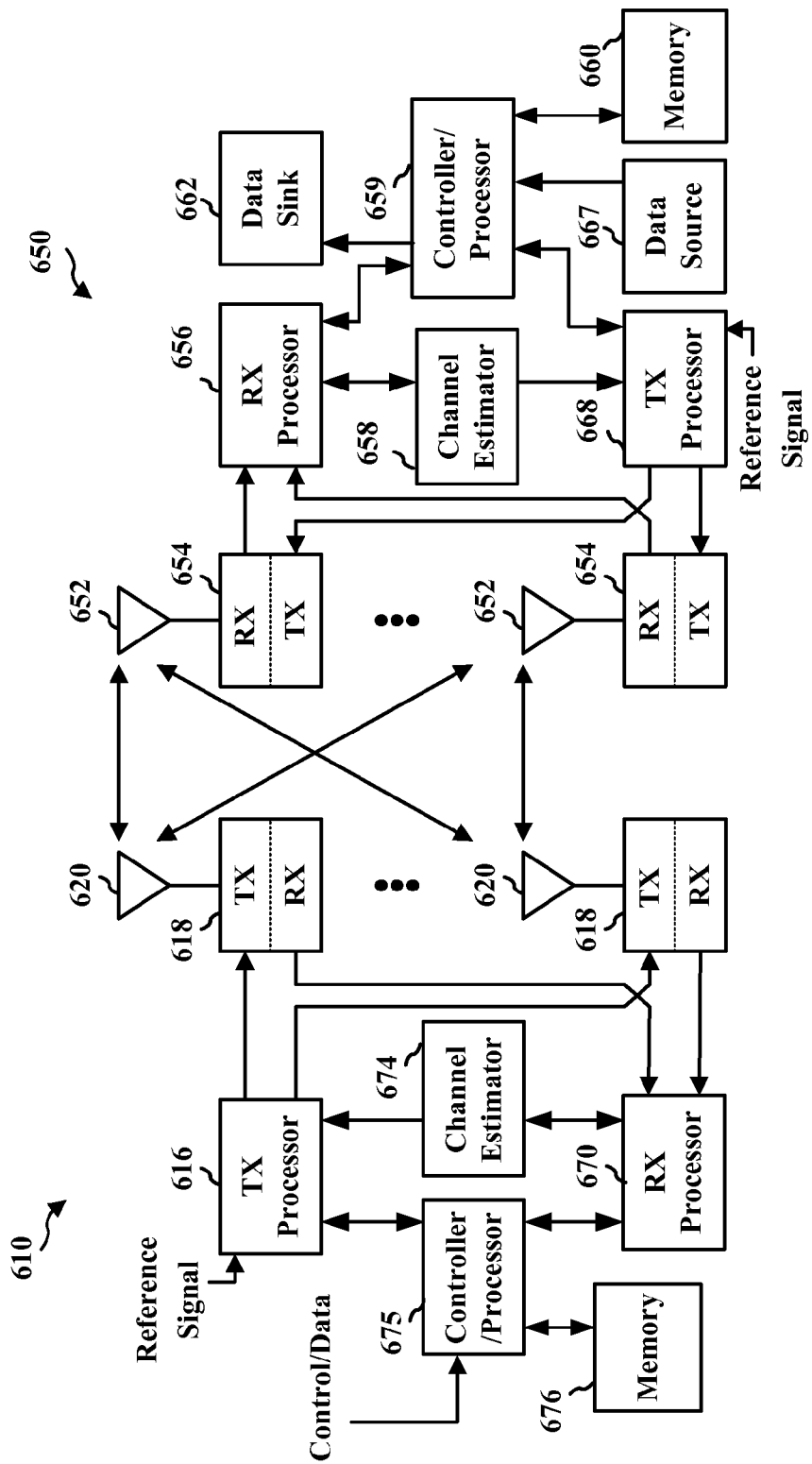
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Interference alignment schemes have been developed to mitigate interference. The interference alignment schemes often require global channel state information (CSI), making it difficult to implement the schemes in practice. An opportunistic interference alignment scheme on the downlink can be more easily implemented in practice by taking advantage of the presence of many UEs being served by a BS. There is currently a need for an interference alignment scheme for the uplink.

Figure 7:
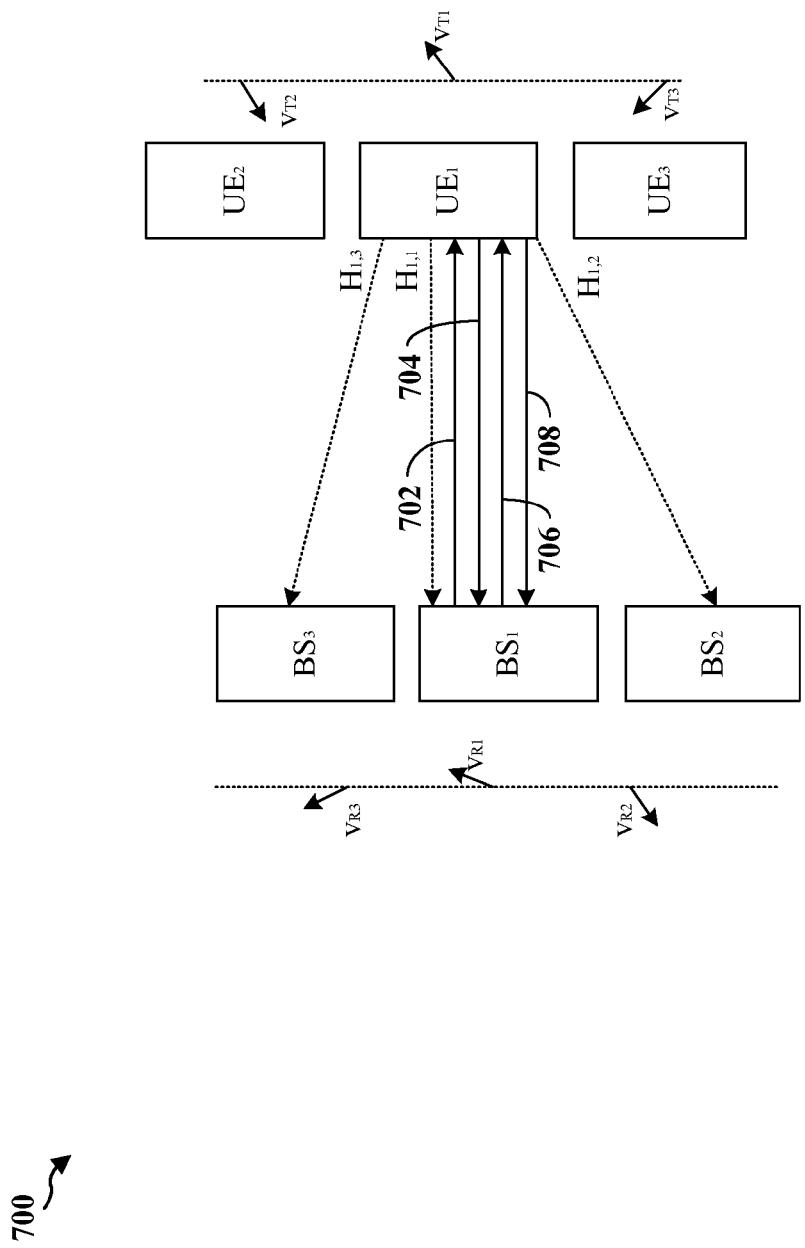
FIG. 7 is a first diagram for illustrating exemplary methods.

FIG. 7 is a first diagram 700 for illustrating exemplary methods. As shown in FIG. 7, the serving BS $BS_1$ sends to each of the UEs $UE_1$, $UE_2$, $UE_3$ being served by the $BS_1$ information 702 indicating receive direction vectors that the $BS_1$, $BS_2$, and $BS_3$ will use to process received uplink transmissions. The information 702 may indicate the receive direction vectors to be used in sequence by the $BS_1$ and the neighboring BSs $BS_2$ and $BS_3$. As such, each of the UEs $UE_1$, $UE_2$, $UE_3$ receives information indicating a receive direction vector $v_{R1}(t)$ for the $BS_1$, a receive direction vector $v_{R2}(t)$ for the $BS_2$, and a receive direction vector $v_{R3}(t)$ for the $BS_3$. The receive direction vector $v_{R1}(t)$ is an ideal direction vector for the $BS_1$ for receiving an uplink transmission from the UEs $UE_1$, $UE_2$, and $UE_3$ that allows the $BS_1$ to cancel interference due to uplink transmissions from UEs served by the $BS_2$ and $BS_3$. The receive direction vector $v_{R2}(t)$ is an ideal direction vector for the $BS_2$ for receiving an uplink transmission from UEs served by the $BS_2$ that allows the $BS_2$ to cancel interference due to uplink transmissions from UEs served by the $BS_3$ and from the UEs $UE_1$, $UE_2$, $UE_3$ served by the $BS_1$. The receive direction vector $v_{R3}(t)$ is an ideal direction vector for the $BS_3$ for receiving an uplink transmission from UEs served by the $BS_3$ that allows the $BS_3$ to cancel interference due to uplink transmissions from UEs served by the $BS_2$ and from the UEs $UE_1$, $UE_2$, $UE_3$ served by the $BS_1$.

Each of the UEs $UE_1$, $UE_2$, $UE_3$ determines a channel between the UE and the $BS_1$ and a channel between the UE and each of the neighboring BSs $BS_2$ and $BS_3$. As such, the $UE_1$ determines the channel $H_{1,1}$ between the $UE_1$ and the $BS_1$, the channel $H_{1,2}$ between the $UE_1$ and the $BS_2$, and the channel $H_{1,3}$ between the $UE_1$ and the $BS_3$. Each of the UEs $UE_1$, $UE_2$, $UE_3$ then determines a transmit direction vector to apply to modulated data symbols for mapping to a set of resource blocks for an uplink transmission. The $UE_1$ determines the transmit direction vector $v_{T1}(t)$, the $UE_2$ determines the transmit direction vector $v_{T2}(t)$, and the $UE_3$ determines the transmit direction vector $v_{T3}(t)$. The transmit direction vectors are determined based on the determined channels and the receive direction vectors. The determined transmit direction vector may also be a function of a quality metric M. The UEs may attempt to minimize an error to the serving BS and an interference caused to neighboring BSs by the uplink transmission by minimizing the quality metric M. The determined transmit direction vector may be less than optimum for the serving BS so as to reduce the interference caused to neighboring BSs by the uplink transmission. With respect to the $UE_1$, the $UE_1$ determines its transmit direction vector $v_{T1}(t)$ as a function of $H_{1,1}$, $H_{1,2}$, $H_{1,3}$, $v_{R1}$, $v_{R2}(t)$, and $v_{R3}(t)$. The $UE_1$ may also determine $v_{T1}(t)$ as a function of the quality metric M.

The transmit direction vectors are applied to modulated data symbols for mapping to a set of resource blocks for an uplink transmission. The transmit direction vectors have N dimensions greater than or equal to two. The N dimensions may be antenna dimensions (MIMO) and/or frequency dimensions (e.g., resource blocks in OFDM). Each dimension may modify modulated data symbols in amplitude and/or phase. For frequency dimensions, the same modulated data symbol is duplicated N times (e.g., 2 times) (and therefore data redundancy is created) and an N-dimensional transmit direction vector is applied to the N modulated data symbols when mapping the N modulated data symbols to N resource elements. Each of the N modulated data symbols in the N resource elements may have a different amplitude and/or phase due to the application of the transmit direction vector. For antenna dimensions, the modulated data symbols are duplicated not through a mapping of modulated data symbols onto resource blocks/elements, but through the transmission of the same modulated data symbols through a plurality of transmit antennas. Each of the N sets of transmit antennas modifies an amplitude and/or phase based on the transmit direction vector.

Each of the UEs $UE_1$, $UE_2$, $UE_3$ determines an interference that would be caused to the $BS_2$ and the $BS_3$ by the uplink transmission based on the transmit direction vector, the channels between the UEs and the neighboring BSs, and the receive direction vectors of the neighboring BSs. Accordingly, the $UE_1$ determines the interference that would be caused to the $BS_2$ by an uplink transmission as a function of the transmit direction vector $v_{T1}(t)$, the receive direction vector $v_{R2}(t)$, and the channel $H_{1,2}$, and determines the interference that would be caused to the $BS_3$ by the uplink transmission as a function of the transmit direction vector $v_{T1}(t)$, the receive direction vector $v_{R3}(t)$, and the channel $H_{1,3}$. Each of the UEs then transmits information 704 to the $BS_1$ indicating the interference. The UEs may transmit the information 704 through the quality metric M, which contains information indicating the interference that would be caused to the $BS_2$ and the $BS_3$ by the uplink transmission.

Each of the UEs $UE_1$, $UE_2$, $UE_3$ may also determine a receive signal power of the uplink transmission based on the transmit direction vector, the channel between the UEs and the serving BS, and the receive direction vector of the serving BS. Accordingly, the $UE_1$ determines the receive signal power of the uplink transmission as a function of the transmit direction vector $v_{T1}(t)$, the receive direction vector $v_{R1}(t)$, and the channel $H_{1,1}$. Each of the UEs may then transmit information 704 to the $BS_1$ indicating the receive signal power. The UEs may transmit the information 704 through the quality metric M, which contains information indicating the signal power at which the $BS_1$ would receive the uplink transmission.

For example, the $UE_1$ may determine the receive signal power S as $S = v_{R1}^T H_{1,1} v_{T1}$ ($v_{R1}^T$ is the transpose of $v_{R1}$), the interference $I_2$ to the $BS_2$ as $I_2 = v_{R2}^T H_{1,2} v_{T1}$, and the interference $I_3$ to the $BS_3$ as $I_3 = v_{R3}^T H_{1,3} v_{T1}$. An error E at the $BS_1$ may be determined as $E = (1-S)^2 = (1 - v_{R1}^T H_{1,1} v_{T1})^2$. The quality metric $M(v_{T1})$ may be equal to $E + (I_2)^2 + (I_3)^2$. The $UE_1$ may determine the $v_{T1}*$ that minimizes $M(v_{T1})$. The $UE_1$ may then report back to the $BS_1$ one or more of the receive signal power $S(v_{T1}*)$ of the uplink transmission, the interference $I_2(v_{T1}*)$ to the $BS_2$, the interference $I_3(v_{T1}*)$ to the $BS_3$, and value of the quality metric $M(v_{T1}*)$ (which is a function of the determined transmit direction vector $v_{T1}*$).

The $BS_1$ receives the transmitted information 704 from each of the UEs $UE_1$, $UE_2$, and $UE_3$, and opportunistically schedules (selects) one of the UEs for the opportunistic interference alignment uplink transmission based on the received information. The $BS_1$ may select the UE that can provide the least error and the least interference based on the quality metric M. The $BS_1$ may also base its selection of the UE on other factors, such as how often the UE has been scheduled with the opportunistic interference alignment uplink transmission, how long ago the UE has been scheduled with the opportunistic interference alignment uplink transmission, how much data the UE has to transmit to the $BS_1$, the information provided by other UEs, etc.

The $BS_1$ then sends an indication 706 to the UE indicating to the UE that the UE was selected for the uplink transmission. Assume the $BS_1$ selects the $UE_1$ for the uplink transmission. The $UE_1$ receives the indication 706 of the selection for the uplink transmission from the $BS_1$. Subsequently, at the scheduled time, the $UE_1$ transmits the set of resource blocks 708 in the uplink transmission to the $BS_1$ using the transmit direction vector $v_{T1}*$. The transmission has N dimensions (e.g., 2), which may be frequency dimensions or antenna dimensions.

Each of the UEs $UE_1$, $UE_2$, $UE_3$ may determine the channels between the UE and the neighboring BSs based on downlink pilot signals received from each of the neighboring BSs. Accordingly, each UE may receive downlink pilot signals from the neighboring BSs, determine a channel between the neighboring BSs and the UE, and assume the channel between the UE and each of the neighboring BSs is equal to the channel between the neighboring BSs and the UE. For example, the $UE_1$ may receive downlink pilot signals from the $BS_2$, determine a downlink channel $H_{BS2,UE1}$ between the $BS_2$ and the $UE_1$, and assume the uplink channel $H_{1,2}$ between the $UE_1$ and the $BS_2$ is equal to the downlink channel $H_{BS2,UE1}$ (i.e., $H_{1,2}=H_{BS2,UE1}$). Similarly, the $UE_1$ may receive downlink pilot signals from the $BS_3$, determine a downlink channel $H_{BS3,UE1}$ between the $BS_3$ and the $UE_1$, and assume the uplink channel $H_{1,3}$ between the $UE_1$ and the $BS_3$ is equal to the downlink channel $H_{BS3,UE1}$ (i.e., $H_{1,3}=H_{BS3,UE1}$). The UEs may make the assumption that the uplink channel is the same as the downlink channel only in TDD systems. Alternatively, each of the UEs $UE_1$, $UE_2$, $UE_3$ may determine the channels between the UE and the neighboring BSs based on channel feedback received from the serving BS. Each of the UEs may transmit an uplink pilot signal to the serving BS; the neighboring BSs may receive the uplink pilot signal, compute channel feedback, and provide the channel feedback to the serving BS; and the serving BS may provide the received channel feedback to the corresponding UE. Each of the UEs may then determine the channels between the UE and the interfering BSs based on the received channel feedback. For example, the $UE_1$ may transmit uplink pilot signals to the $BS_1$. The $BS_2$ may receive the uplink pilot signals, compute channel feedback based on the received uplink pilot signals, and provide the channel feedback to the $BS_1$. The $BS_1$ may provide the received channel feedback to the $UE_1$, which subsequently computes the channel $H_{1,2}$ based on the received channel feedback.

Each of the UEs $UE_1$, $UE_2$, $UE_3$ may determine the channel between the UE and the serving BS based on downlink pilot signals received from the serving BS. Accordingly, each UE may receive downlink pilot signals from the serving BS, determine a channel between the serving BS and the UE, and assume the channel between the UE and the serving BS is equal to the channel between the serving BS and the UE. For example, the $UE_1$ may receive downlink pilot signals from the $BS_1$, determine a downlink channel $H_{BS1,UE1}$ between the $BS_1$ and the $UE_1$, and assume the uplink channel $H_{1,1}$ between the $UE_1$ and the $BS_1$ is equal to the downlink channel $H_{BS1,UE1}$ (i.e., $H_{1,1}=H_{BS1,UE1}$). The UEs may make the assumption that the uplink channel is the same as the downlink channel only in TDD systems. Alternatively, each of the UEs $UE_1$, $UE_2$, $UE_3$ may determine the channel between the UE and the serving BS based on channel feedback received from the serving BS. Each of the UEs may transmit an uplink pilot signal to the serving BS, and receive channel feedback from the serving BS based on the uplink pilot signal. Each of the UEs may then determine the channel between the UE and the serving BS based on the received channel feedback. For example, the $UE_1$ may transmit uplink pilot signals to the $BS_1$, receive channel feedback based on the uplink pilot signals, and determine the channel $H_{1,1}$ based on the received channel feedback.

Figure 8:
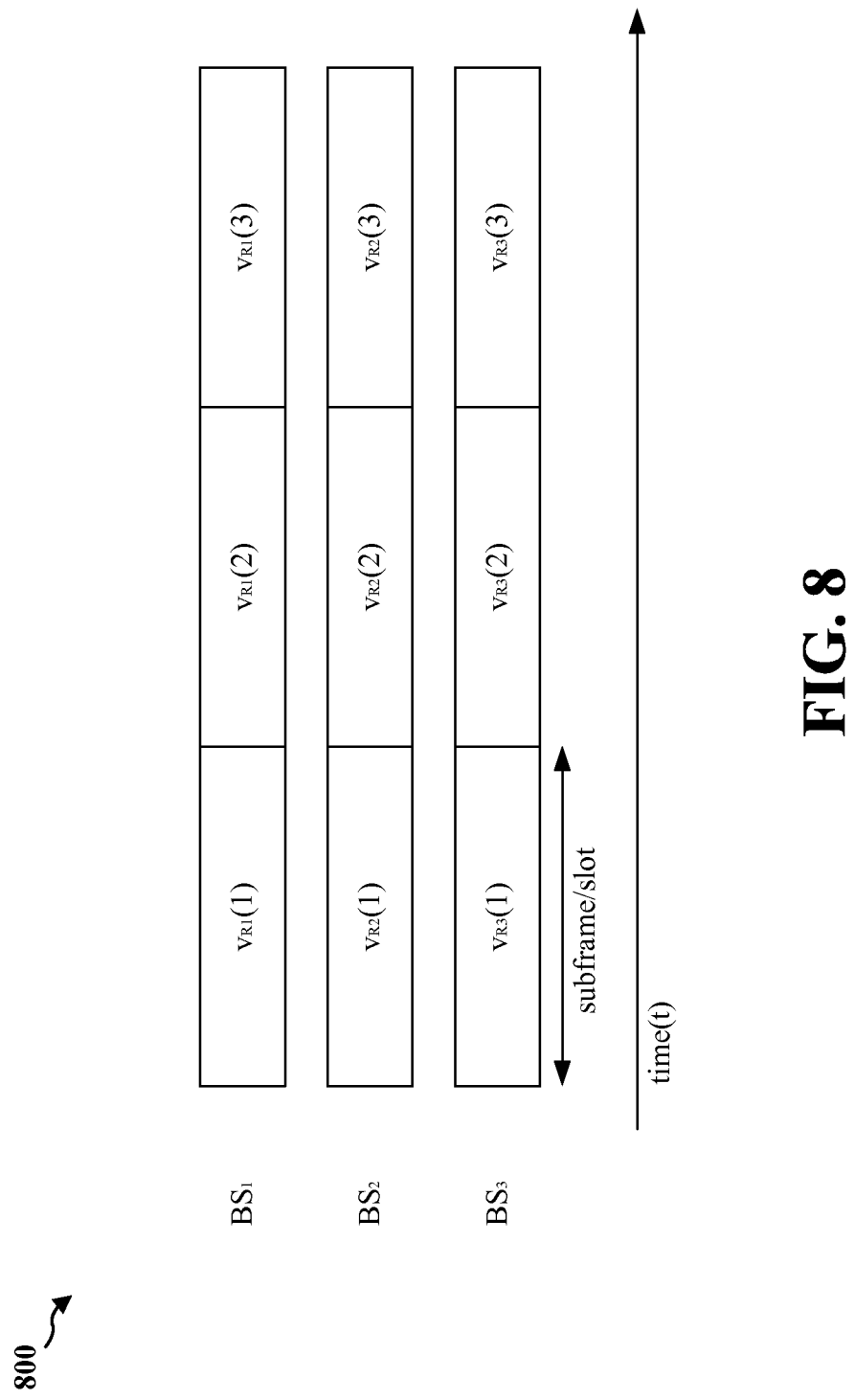
FIG. 8 is a second diagram for illustrating exemplary methods.

FIG. 8 is a second diagram 800 for illustrating exemplary methods. As shown in FIG. 8, each of the BSs $BS_1$, $BS_2$, $BS_3$ may synchronously change the direction vectors each subframe/slot. The director vectors may be predetermined and known a priori by each of the BSs. The direction vectors may be based on different pseudo-random sequences or seeds and may hop around to different values. The direction vectors may be dependent on an identifier of the BS, subcarriers of the utilized resource blocks, or a corresponding subframe and/or system frame number. When a direction vector depends on the subframe and/or on a system frame number, the direction vector may be said to be time-varying.

Figure 9:
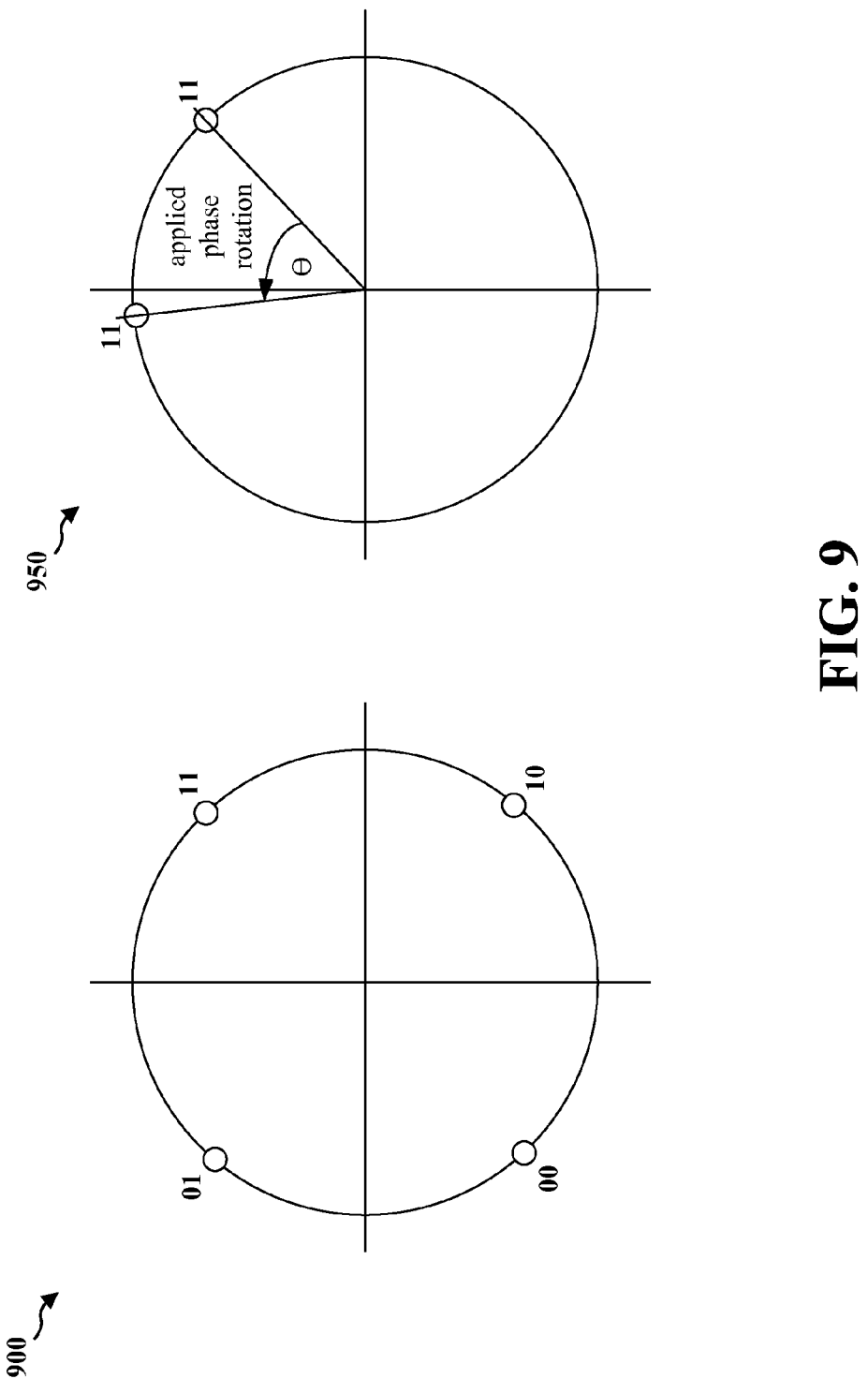
FIG. 9 is a third diagram for illustrating exemplary methods.

FIG. 9 is a third diagram 900 for illustrating exemplary methods. FIG. 9 specifically illustrates the phase rotation of a modulated data symbol. As discussed supra, a UE selected for an uplink transmission applies a direction vector to modulated data symbols before transmitting (frequency dimensions) the modulated data symbols or when transmitting (antenna dimensions) the modulated data symbols. The direction vector modifies an amplitude and/or a phase of the modulated data symbols. Assume that the number of dimensions is two (i.e., N=2). Accordingly, with respect to the $UE_1$, $v_{T1}(t)=[v_1(t)\ v_2(t)]$, where $v_1(t)=A_1 e^{j\Theta_1}$ and $v_2(t)=A_2 e^{j\Theta_2}$. Assume also that the direction vector $v_{T1}(t)$ modifies the modulated data symbols in phase only (i.e., $A_1=1$ and $A_2=1$). Further, assume the $UE_1$ modulates the data using QPSK. The diagram 900 illustrates possible QPSK values. As shown in the diagram 950, if the $UE_1$ applies a phase rotation to the QPSK value 11, the $UE_1$ may rotate a phase of the modulated symbol by $\theta$. In a frequency dimension configuration, the $UE_1$ duplicates the data by mapping the same data to both a first set of resource blocks/elements and a second set of resource blocks/elements. The $UE_1$ applies a first phase rotation $\theta_1$ to modulated data symbols in the first set of resource blocks/elements and a second phase rotation $\theta_2$ to modulated data symbols in the second set of resource blocks/elements. In an antenna dimension configuration, the $UE_1$ duplicates the modulated data symbols not through a mapping of modulated data symbols onto resource blocks/elements, but through the transmission of the same modulated data symbols through a plurality of transmit antennas. A first set of transmit antennas applies a first phase rotation $\theta_1$ to the modulated data symbols and a second set of transmit antennas applies a second phase rotation $\theta_2$ to the modulated data symbols.

Figure 10:
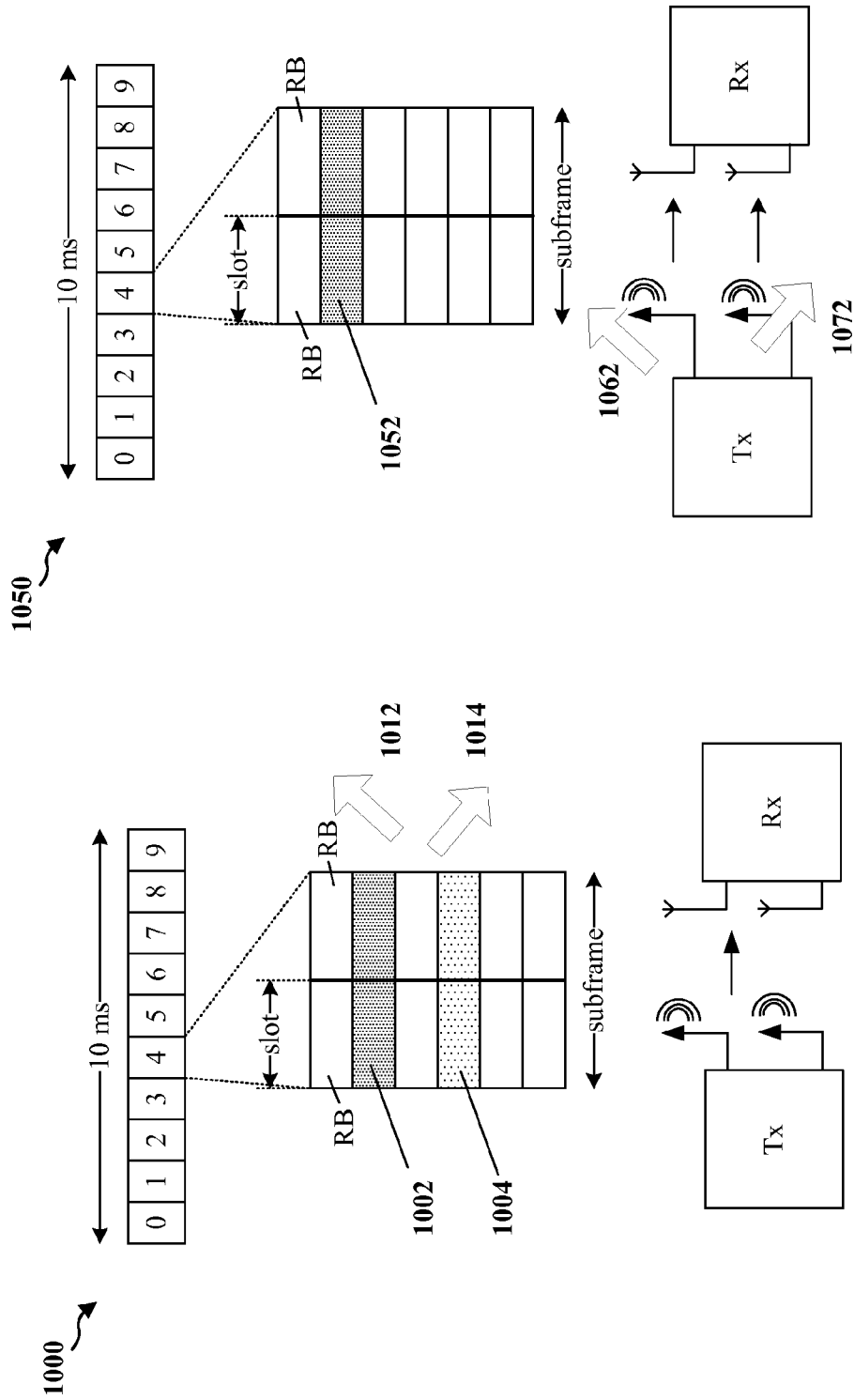
FIG. 10A is a fourth diagram for illustrating exemplary methods.
FIG. 10B is a fifth diagram for illustrating exemplary methods.

FIG. 10A is a fourth diagram 1000 for illustrating exemplary methods. When applying frequency dimensions, the UEs $UE_1$, $UE_2$, $UE_3$ map the same modulated data symbols to both a first set of resource blocks/elements and to a second set of resource blocks/elements. For FIG. 10A, assume that the UEs $UE_1$, $UE_2$, $UE_3$ map the same modulated data symbols to different sets of resource blocks (i.e., the granularity is resource blocks and not resource elements). Accordingly, the $UE_1$ may map the same modulated data symbols to a first set of resource blocks 1002 and to a second set of resource blocks 1004. The $UE_1$ applies the direction vector $v_{T1}(t)$ to the modulated data symbols in the first set of resource blocks 1002 and the second set of resource blocks 1004, which results in the modulated data symbols in the first set of resource blocks and the second set of resource blocks being modified in amplitude and/or phase as shown by the arrows 1012, 1014.

FIG. 10B is a fifth diagram 1050 for illustrating exemplary methods. When applying antenna dimensions, the UEs $UE_1$, $UE_2$, $UE_3$ map modulated data symbols to a set of resource blocks/elements and transmit the same set of resource blocks/elements using a different set of transmit antennas to apply the direction vector on the modulated data symbols. Accordingly, the $UE_1$ may map modulated data symbols to a set of resource blocks 1052 and transmit the set of resource blocks 1052 through different transmit antennas so as to modify an amplitude and/or a phase of the modulated data symbols based on the direction vector $v_{T1}(t)$ as shown by the arrows 1062, 1072.

Figure 11:
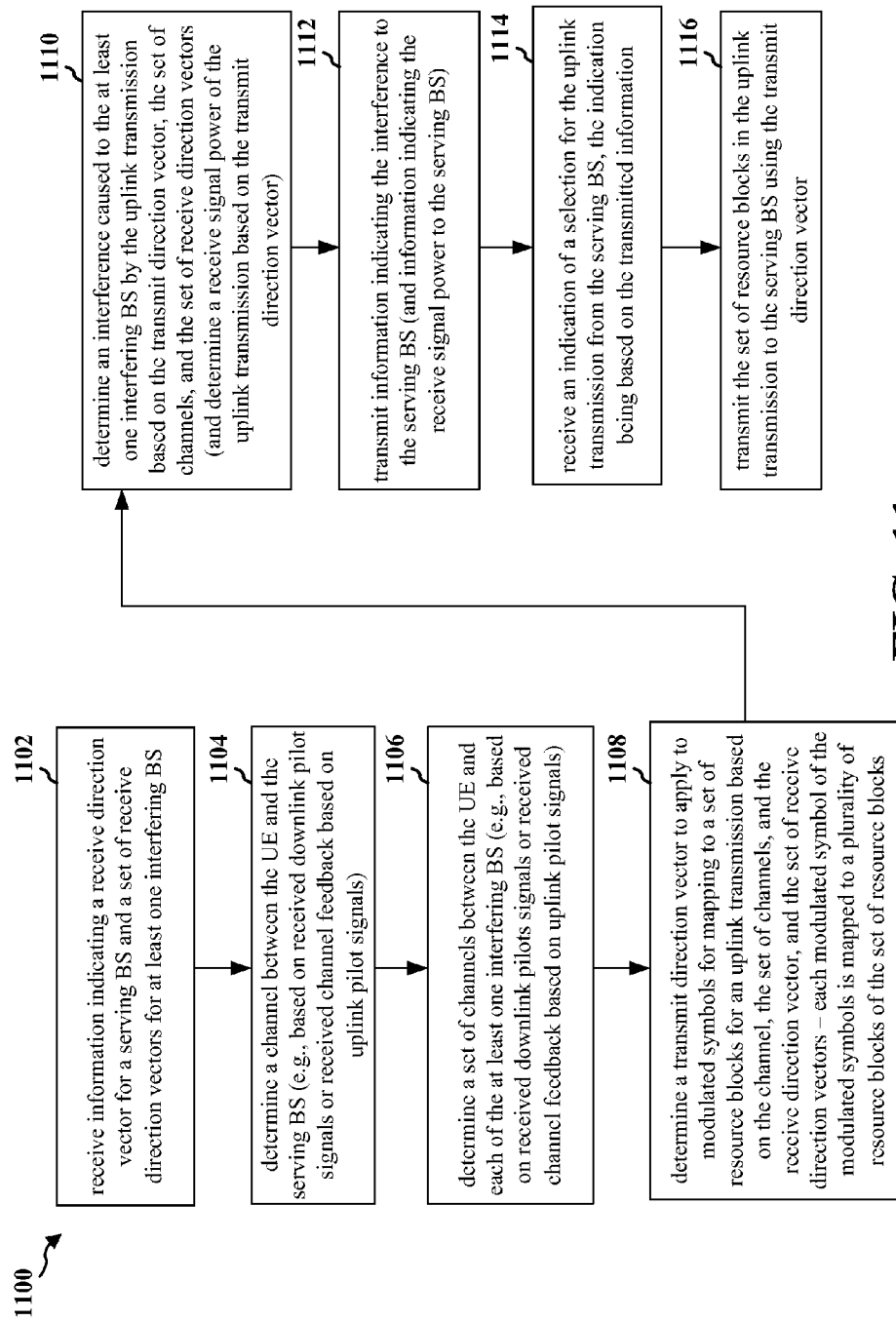
FIG. 11 is a flow chart of a method of wireless communication.

FIG. 11 is a flow chart 1100 of a method of wireless communication. The method may be performed by a UE. As shown in FIG. 11, in step 1102, a UE receives information indicating a receive direction vector for a serving BS and a set of receive direction vectors for at least one interfering BS. In step 1102, the received information may indicate the receive direction vector to be used in sequence by the serving BS and the set of receive direction vectors to be used in sequence by the at least one interfering BS. In step 1104, the UE determines a channel between the UE and the serving BS. In step 1106, the UE determines a set of channels between the UE and each of the at least one interfering BS. In step 1108, the UE determines a transmit direction vector to apply to modulated symbols for mapping to a set of resource blocks for an uplink transmission based on the channel, the set of channels, the receive direction vector, and the set of receive direction vectors. Each modulated symbol of the modulated symbols is mapped to a plurality of resource blocks of the set of resource blocks. In step 1110, the UE determines an interference caused to the at least one interfering BS by the uplink transmission based on the transmit direction vector, the set of channels, and the set of receive direction vectors. In step 1110, the UE may also determine a receive signal power of the uplink transmission based on the transmit direction vector. In step 1112, the UE transmits information indicating the interference to the serving BS. In step 1112, the UE may also transmit information indicating the receive signal power to the serving BS. In step 1114, the UE may receive an indication of a selection for the uplink transmission from the serving BS. The indication may be based on the transmitted information. In step 1116, the UE may transmit the set of resource blocks in the uplink transmission to the serving BS using the transmit direction vector.

The UE may receive a downlink pilot signal from the serving BS and determine the channel based on the received downlink pilot signal (e.g., in TDD systems). The UE may receive a set of downlink pilot signals from the at least one interfering BS and determine the set of channels based on the received set of downlink pilot signals (e.g., in TDD systems). The UE may transmit an uplink pilot signal to the serving BS, receive channel feedback from the serving BS based on the uplink pilot signal, and determine the channel based on the channel feedback. The UE may also determine the set of channels based on the channel feedback. As such, the channel feedback may include channel feedback from the at least one interfering BS, which provided the channel feedback to the serving BS.

For example, referring to FIG. 7, the $UE_1$ receives information indicating a receive direction vector $v_{R1}(t)$ for the serving BS $BS_1$ and a set of receive direction vectors $v_{R2}(t)$ and $v_{R3}(t)$ for at least one interfering BS $BS_2$ and $BS_3$. The $UE_1$ determines a channel $H_{1,1}$ between the $UE_1$ and the serving BS $BS_1$. The $UE_1$ determines a set of channels $H_{1,2}$ and $H_{1,3}$ between the $UE_1$ and each of the at least one interfering BS $BS_2$ and $BS_3$. The $UE_1$ determines a transmit direction vector $v_{T1}^*$ to apply to modulated symbols for mapping to a set of resource blocks for an uplink transmission based on the channel $H_{1,1}$, the set of channels $H_{1,2}$ and $H_{1,3}$, the receive direction vector $v_{R1}(t)$, and the set of receive direction vectors $v_{R2}(t)$ and $v_{R3}(t)$. Each modulated symbol of the modulated symbols is mapped to a plurality of resource blocks of the set of resource blocks (see FIGS. 10A, 10B). The $UE_1$ determines an interference $I_2$ and $I_3$ caused to the at least one interfering BS $BS_2$ and $BS_3$ by the uplink transmission based on the transmit direction vector $v_{T1}^*$, the set of channels $H_{1,2}$ and $H_{1,3}$, and the set of receive direction vectors $v_{R2}(t)$ and $v_{R3}(t)$. The UE may also determine a receive signal power S of the uplink transmission based on the transmit direction vector $v_{T1}^*$. The $UE_1$ transmits information indicating the interference (e.g., $I_2$ and $I_3$ and/or $M(v_{T1}^*)$) to the serving BS $BS_1$. The $UE_1$ may also transmit information indicating the receive signal power (e.g., S and/or $M(v_{T1}^*)$) to the serving BS $BS_1$. If the $UE_1$ is selected for the uplink transmission, the $UE_1$ receives an indication of a selection for the uplink transmission from the serving BS $BS_1$. The indication may be based on the transmitted information. The $UE_1$ may then transmit the set of resource blocks in the uplink transmission to the serving BS $BS_1$ using the transmit direction vector $v_{T1}^*$.

Figure 12:
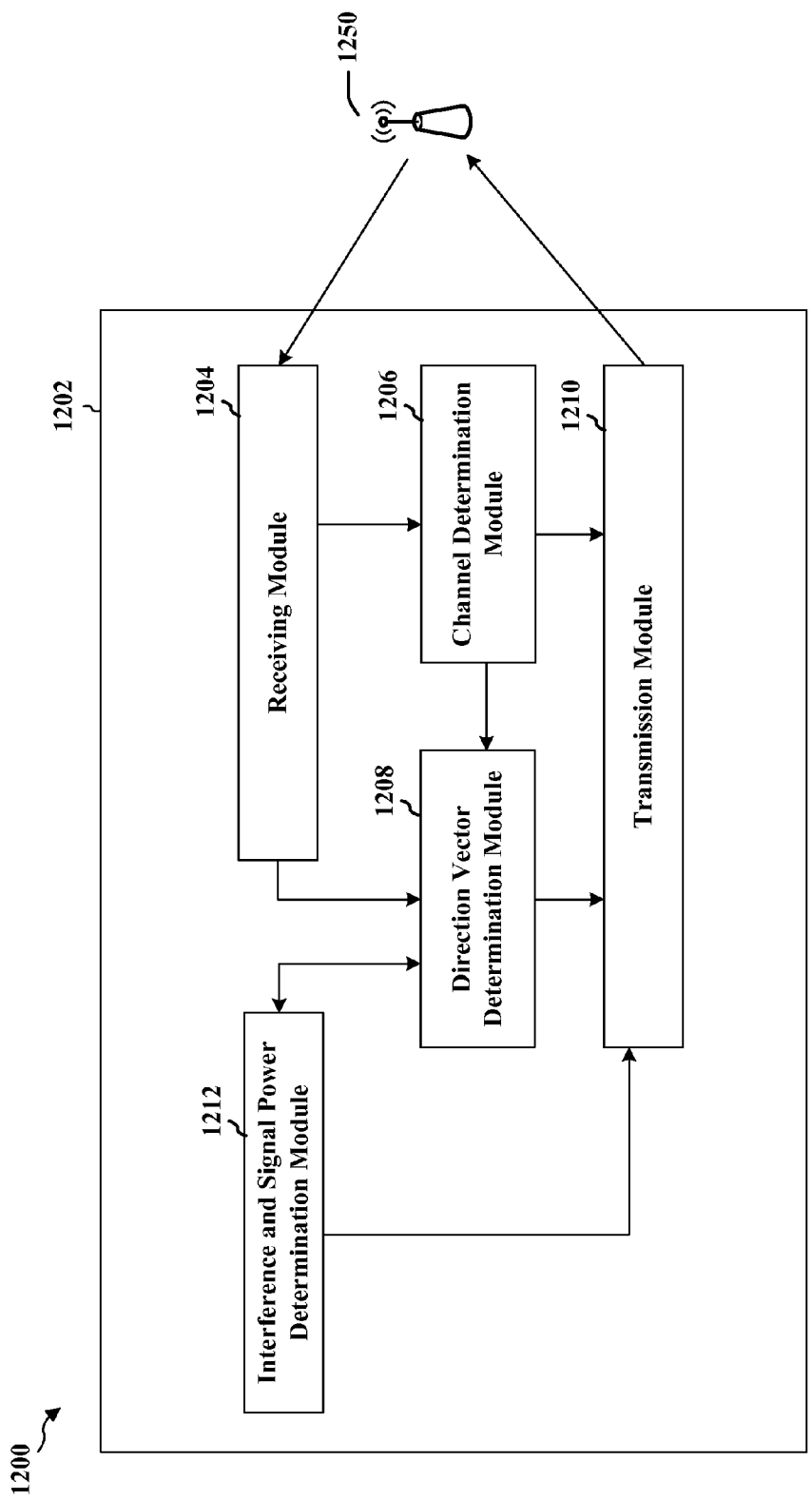
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus includes a receiving module 1204 that is configured to receive information indicating a receive direction vector for a serving BS and a set of receive direction vectors for at least one interfering BS. The received information may indicate the receive direction vector to be used in sequence by the serving BS and the set of receive direction vectors to be used in sequence by the at least one interfering BS. The apparatus further includes a channel determination module 1206 that is configured to determine a channel between the UE and the serving BS. The channel determination module 1206 is further configured to determine a set of channels between the UE and each of the at least one interfering BS. The apparatus further includes a direction vector determination module 1208 that is configured to determine a transmit direction vector to apply to modulated symbols for mapping to a set of resource blocks for an uplink transmission based on the channel, the set of channels, the receive direction vector, and the set of receive direction vectors. Each modulated symbol of the modulated symbols is mapped to a plurality of resource blocks of the set of resource blocks. The apparatus further includes an interference and signal power determination module 1212 that is configured to determine an interference caused to the at least one interfering BS by the uplink transmission based on the transmit direction vector, the set of channels, and the set of receive direction vectors. The apparatus further includes a transmission module 1210 that is configured to transmit information indicating the interference to the serving BS.

The receiving module 1204 may be configured to receive an indication of a selection for the uplink transmission from the serving BS, the indication being based on the transmitted information. The transmission module 1210 may be configured to transmit the set of resource blocks in the uplink transmission to the serving BS using the transmit direction vector. The interference and signal power determination module 1212 may be further configured to determine a receive signal power of the uplink transmission based on the transmit direction vector. The transmission module 1210 may be further configured to transmit information indicating the receive signal power to the serving BS. The receiving module 1204 may be further configured to receive a downlink pilot signal from the serving BS. The channel determination module 1206 may be configured to determine the channel based on the received downlink pilot signal (e.g., in TDD systems). The receiving module 1204 may be configured to receive a set of downlink pilot signals from the at least one interfering BS. The channel determination module 1206 may be configured to determine the set of channels based on the received set of downlink pilot signals (e.g., in TDD systems). The transmission module 1210 may be configured to transmit an uplink pilot signal to the serving BS. The receiving module 1204 may be configured to receive channel feedback from the serving BS based on the uplink pilot signal. The channel determination module 1206 may be configured to determine the channel based on the channel feedback. The channel determination module 1206 may be further configured to determine the set of channels based on the channel feedback, assuming the interfering BSs received the uplink pilot signal and provided the channel feedback to the serving BS, which then provided the channel feedback to the UE.

The apparatus may include additional modules that perform each of the steps of the algorithm in the aforementioned flow chart of FIG. 11. As such, each step in the aforementioned flow chart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
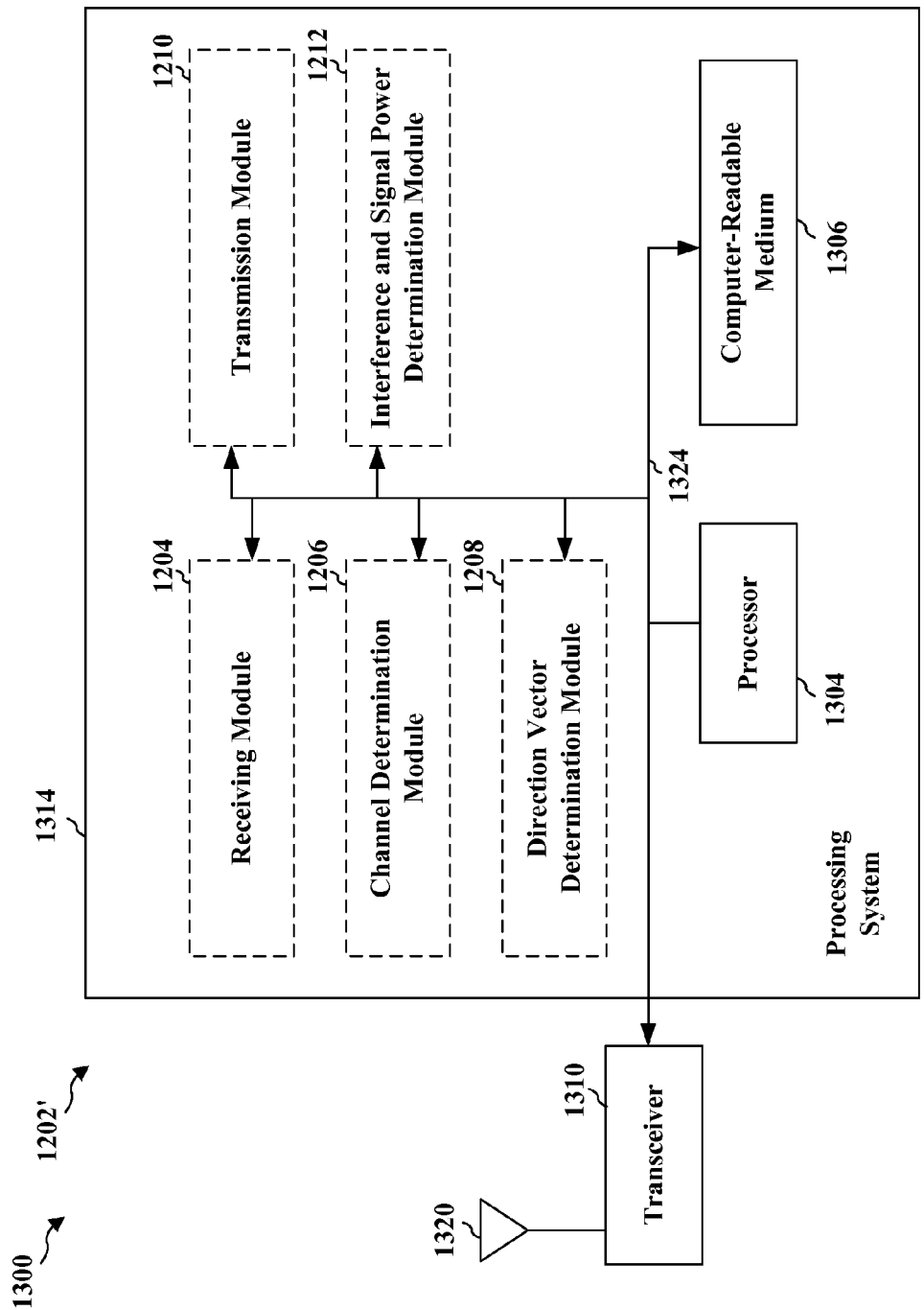
FIG. 13 is a diagram illustrating an example of a hardware implementation for an apparatus employing a processing system.

FIG. 13 is a diagram 1300 illustrating an example of a hardware implementation for an apparatus 1302' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212 and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the receiving module 1304. In addition, the transceiver 1310 receives information from the processing system 1314, specifically the transmission module 1310, and based on the received information, generates a signal to be applied to the one or more antennas 1320. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, 1210, and 1212. The modules may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1302/1302' for wireless communication is a UE and includes means for receiving information indicating a receive direction vector for a serving base station and a set of receive direction vectors for at least one interfering base station, means for determining a channel between the UE and the serving base station, means for determining a set of channels between the UE and each of the at least one interfering base station, and means for determining a transmit direction vector to apply to modulated symbols for mapping to a set of resource blocks for an uplink transmission based on the channel, the set of channels, the receive direction vector, and the set of receive direction vectors. Each modulated symbol of the modulated symbols is mapped to a plurality of resource blocks of the set of resource blocks. The apparatus further includes means for determining an interference caused to the at least one interfering base station by the uplink transmission based on the transmit direction vector, the set of channels, and the set of receive direction vectors. The apparatus further includes means for transmitting information indicating the interference to the serving base station. The apparatus may further include means for receiving an indication of a selection for the uplink transmission from the serving base station. The indication is based on the transmitted information. The apparatus may further include means for transmitting the set of resource blocks in the uplink transmission to the serving base station using the transmit direction vector. The apparatus may further include means for determining a receive signal power of the uplink transmission based on the transmit direction vector, and means for transmitting information indicating the receive signal power to the serving base station. The apparatus may further include means for receiving a downlink pilot signal from the serving base station, wherein the channel is determined based on the received downlink pilot signal. The apparatus may further include means for receiving a set of downlink pilot signals from the at least one interfering base station. The set of channels is determined based on the received set of downlink pilot signals. The apparatus further includes means for transmitting an uplink pilot signal to the serving base station, and means for receiving channel feedback from the serving base station based on the uplink pilot signal. The channel is determined based on the channel feedback. As discussed supra, the set of channels may also be determined based on the channel feedback. The received information may indicate the receive direction vector to be used in sequence by the serving base station and the set of receive direction vectors to be used in sequence by the at least one interfering base station.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
   receiving information indicating a receive direction vector for a serving base station and a set of receive direction vectors for at least one interfering base station;
   determining a channel between the UE and the serving base station;
   determining a set of channels between the UE and each of the at least one interfering base station;
   determining a transmit direction vector to apply to modulated symbols for mapping to a set of resource blocks for an uplink transmission based on the channel, the set of channels, the receive direction vector, and the set of receive direction vectors, each modulated symbol of the modulated symbols being mapped to a plurality of resource blocks of the set of resource blocks;
   determining an interference caused to the at least one interfering base station by the uplink transmission based on the transmit direction vector, the set of channels, and the set of receive direction vectors; and
   transmitting information indicating the interference to the serving base station.

2. The method of claim 1, further comprising:
   receiving an indication of a selection for the uplink transmission from the serving base station, the indication being based on the transmitted information; and
   transmitting the set of resource blocks in the uplink transmission to the serving base station using the transmit direction vector.

3. The method of claim 1, further comprising:
   determining a receive signal power of the uplink transmission based on the transmit direction vector; and
   transmitting information indicating the receive signal power to the serving base station.

4. The method of claim 1, further comprising receiving a downlink pilot signal from the serving base station, wherein the channel is determined based on the received downlink pilot signal.

5. The method of claim 1, further comprising receiving a set of downlink pilot signals from the at least one interfering base station, wherein the set of channels is determined based on the received set of downlink pilot signals.

6. The method of claim 1, further comprising:
   transmitting an uplink pilot signal to the serving base station; and
   receiving channel feedback from the serving base station based on the uplink pilot signal,
   wherein the channel is determined based on the channel feedback.

7. The method of claim 6, wherein the set of channels is determined based on the channel feedback.

8. The method of claim 1, wherein the received information indicates the receive direction vector to be used in sequence by the serving base station and the set of receive direction vectors to be used in sequence by the at least one interfering base station.

9. An apparatus for wireless communication, the apparatus being a user equipment (UE), comprising:
   means for receiving information indicating a receive direction vector for a serving base station and a set of receive direction vectors for at least one interfering base station;
   means for determining a channel between the UE and the serving base station;
   means for determining a set of channels between the UE and each of the at least one interfering base station;
   means for determining a transmit direction vector to apply to modulated symbols for mapping to a set of resource blocks for an uplink transmission based on the channel, the set of channels, the receive direction vector, and the set of receive direction vectors, each modulated symbol of the modulated symbols being mapped to a plurality of resource blocks of the set of resource blocks;
   means for determining an interference caused to the at least one interfering base station by the uplink transmission based on the transmit direction vector, the set of channels, and the set of receive direction vectors; and
   means for transmitting information indicating the interference to the serving base station.

10. The apparatus of claim 9, further comprising:
    means for receiving an indication of a selection for the uplink transmission from the serving base station, the indication being based on the transmitted information; and
    means for transmitting the set of resource blocks in the uplink transmission to the serving base station using the transmit direction vector.

11. The apparatus of claim 9, further comprising:
    means for determining a receive signal power of the uplink transmission based on the transmit direction vector; and
    means for transmitting information indicating the receive signal power to the serving base station.

12. The apparatus of claim 9, further comprising means for receiving a downlink pilot signal from the serving base station, wherein the channel is determined based on the received downlink pilot signal.

13. The apparatus of claim 9, further comprising means for receiving a set of downlink pilot signals from the at least one interfering base station, wherein the set of channels is determined based on the received set of downlink pilot signals.

14. The apparatus of claim 9, further comprising:
    means for transmitting an uplink pilot signal to the serving base station; and
    means for receiving channel feedback from the serving base station based on the uplink pilot signal,
    wherein the channel is determined based on the channel feedback.

15. The apparatus of claim 14, wherein the set of channels is determined based on the channel feedback.

16. The apparatus of claim 9, wherein the received information indicates the receive direction vector to be used in sequence by the serving base station and the set of receive direction vectors to be used in sequence by the at least one interfering base station.

17. An apparatus for wireless communication, the apparatus being a user equipment (UE), comprising:
a processing system configured to:
receive information indicating a receive direction vector for a serving base station and a set of receive direction vectors for at least one interfering base station;
determine a channel between the UE and the serving base station;
determine a set of channels between the UE and each of the at least one interfering base station;
determine a transmit direction vector to apply to modulated symbols for mapping to a set of resource blocks for an uplink transmission based on the channel, the set of channels, the receive direction vector, and the set of receive direction vectors, each modulated symbol of the modulated symbols being mapped to a plurality of resource blocks of the set of resource blocks;
determine an interference caused to the at least one interfering base station by the uplink transmission based on the transmit direction vector, the set of channels, and the set of receive direction vectors; and
transmit information indicating the interference to the serving base station.

18. The apparatus of claim 17, wherein the processing system is further configured to:
receive an indication of a selection for the uplink transmission from the serving base station, the indication being based on the transmitted information; and
transmit the set of resource blocks in the uplink transmission to the serving base station using the transmit direction vector.

19. The apparatus of claim 17, wherein the processing system is further configured to:
determine a receive signal power of the uplink transmission based on the transmit direction vector; and
transmit information indicating the receive signal power to the serving base station.

20. The apparatus of claim 17, wherein the processing system is further configured to receive a downlink pilot signal from the serving base station, wherein the channel is determined based on the received downlink pilot signal.

21. The apparatus of claim 17, wherein the processing system is further configured to receive a set of downlink pilot signals from the at least one interfering base station, wherein the set of channels is determined based on the received set of downlink pilot signals.

22. The apparatus of claim 17, wherein the processing system is further configured to:
transmit an uplink pilot signal to the serving base station; and
receive channel feedback from the serving base station based on the uplink pilot signal,
wherein the channel is determined based on the channel feedback.

23. The apparatus of claim 22, wherein the set of channels is determined based on the channel feedback.

24. The apparatus of claim 17, wherein the received information indicates the receive direction vector to be used in sequence by the serving base station and the set of receive direction vectors to be used in sequence by the at least one interfering base station.

25. A computer program product, comprising:
a non-transitory computer-readable medium comprising executable code for:
receiving information indicating a receive direction vector for a serving base station and a set of receive direction vectors for at least one interfering base station;
determining a channel between the UE and the serving base station;
determining a set of channels between the UE and each of the at least one interfering base station;
determining a transmit direction vector to apply to modulated symbols for mapping to a set of resource blocks for an uplink transmission based on the channel, the set of channels, the receive direction vector, and the set of receive direction vectors, each modulated symbol of the modulated symbols being mapped to a plurality of resource blocks of the set of resource blocks;
determining an interference caused to the at least one interfering base station by the uplink transmission based on the transmit direction vector, the set of channels, and the set of receive direction vectors; and
transmitting information indicating the interference to the serving base station.

26. The computer program product of claim 25, wherein the computer-readable medium further comprises code for:
receiving an indication of a selection for the uplink transmission from the serving base station, the indication being based on the transmitted information; and
transmitting the set of resource blocks in the uplink transmission to the serving base station using the transmit direction vector.

27. The computer program product of claim 25, wherein the computer-readable medium further comprises code for:
determining a receive signal power of the uplink transmission based on the transmit direction vector; and
transmitting information indicating the receive signal power to the serving base station.

28. The computer program product of claim 25, wherein the computer-readable medium further comprises code for receiving a downlink pilot signal from the serving base station, wherein the channel is determined based on the received downlink pilot signal.

29. The computer program product of claim 25, wherein the computer-readable medium further comprises code for receiving a set of downlink pilot signals from the at least one interfering base station, wherein the set of channels is determined based on the received set of downlink pilot signals.

30. The computer program product of claim 25, wherein the computer-readable medium further comprises code for:
transmitting an uplink pilot signal to the serving base station; and
receiving channel feedback from the serving base station based on the uplink pilot signal,
wherein the channel is determined based on the channel feedback.

31. The computer program product of claim 30, wherein the set of channels is determined based on the channel feedback.

32. The computer program product of claim 25, wherein the received information indicates the receive direction vector to be used in sequence by the serving base station and the set of receive direction vectors to be used in sequence by the at least one interfering base station.

* * * * *